United States Patent
Pande et al.

(10) Patent No.: US 10,236,934 B2
(45) Date of Patent: *Mar. 19, 2019

(54) MULTI-LENGTH CYCLIC PREFIX FOR OFDM TRANSMISSION IN PLC CHANNELS

(71) Applicant: TEXAS INSTRUMENTS INCORPORATED, Dallas, TX (US)

(72) Inventors: Tarkesh Pande, Dallas, TX (US); Anand G. Dabak, Plano, TX (US); Il-Han Kim, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,983

(22) Filed: Sep. 5, 2017

(65) Prior Publication Data

US 2017/0366230 A1    Dec. 21, 2017

Related U.S. Application Data

(60) Continuation of application No. 15/227,367, filed on Aug. 3, 2016, now Pat. No. 9,787,361, which is a division of application No. 13/781,452, filed on Feb. 28, 2013, now Pat. No. 9,438,310.

(60) Provisional application No. 61/604,610, filed on Feb. 29, 2012.

(51) Int. Cl.
*H04B 3/54* (2006.01)

(52) U.S. Cl.
CPC ..... *H04B 3/542* (2013.01); *H04B 2203/5408* (2013.01); *H04B 2203/5416* (2013.01)

(58) Field of Classification Search
CPC .......................................... H04B 3/54
USPC .......................................... 370/474
See application file for complete search history.

(56) References Cited

U.S. PATENT DOCUMENTS

| | | | |
|---|---|---|---|
| 8,238,318 B1* | 8/2012 | Negus | H04W 84/12 370/338 |
| 8,565,082 B1* | 10/2013 | Vargantwar | H04L 27/2607 370/230 |
| 2005/0169363 A1* | 8/2005 | Logvinov | H04B 3/54 375/240 |
| 2008/0285488 A1* | 11/2008 | Walton | H04B 7/022 370/280 |
| 2009/0227255 A1* | 9/2009 | Thakare | H04W 48/10 455/434 |
| 2010/0150099 A1* | 6/2010 | Chen | H04L 5/0007 370/330 |
| 2010/0316140 A1* | 12/2010 | Razazian | H04B 3/54 375/257 |

(Continued)

*Primary Examiner* — Shripal K Khajuria
(74) *Attorney, Agent, or Firm* — Kenneth Liu; Charles A. Brill; Frank D. Cimino

(57) ABSTRACT

Embodiments of the invention provide multiple cyclic prefix lengths for either both the data-payload and frame control header or only the data payload. Frame control header (FCH) and data symbols have an associated cyclic prefix. A table is transmitted in the FCH symbols, which includes a cyclic prefix field to identify the cyclic prefix length used in the data payload. A receiver may know the cyclic prefix length used in the FCH symbols in one embodiment. In other embodiments, the receiver does not know the FCH cyclic prefix length and, therefore, attempts to decode the FCH symbols using different possible cyclic prefix lengths until the FCH symbols are successfully decoded.

20 Claims, 3 Drawing Sheets

(56) References Cited

U.S. PATENT DOCUMENTS

2013/0021179 A1* 1/2013 Jaquette .................. H03M 7/40
                     341/67

* cited by examiner

MULTI-LENGTH CYCLIC PREFIX FOR OFDM TRANSMISSION IN PLC CHANNELS

CROSS-REFERENCE TO RELATED APPLICATION(S)

This application is a Continuation of U.S. patent application Ser. No. 15/227,367, filed Aug. 3, 2016, of and claims the benefit to U.S. patent application Ser. No. 13/781,452, filed on Feb. 28, 2013, which claims the benefit of provisional U.S. Patent Application Ser. No. 61/604,610, filed Feb. 29, 2012, all of which are incorporated herein by this reference.

BACKGROUND

Embodiments of the invention are directed, in general, to Power Line Communication (PLC) systems and, more specifically, OFDM transmissions in PLC channels.

Various OFDM-based standards exist for narrowband power-line communications, such as the G3-CENA, G.hnem, IEEE-P1901.2 standards. In each of these standards, the OFDM system is designed assuming a fixed cyclic prefix length.

In some PLC communication links, it is envisioned that the channel delay spread may be significantly different from the cyclic prefix length specified for the standard in use. If the channel delay spread is longer than the cyclic prefix, this will result in an signal-to-noise ratio (SNR) loss in the received data. If the channel delay spread is shorter than the cyclic prefix, this will result in a reduction in channel throughput which may be significant for long packet length transmissions.

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics. PRIME is designed for low voltage lines with low noise and targets higher data rates. On the other hand, G3 is designed for medium voltage lines and targets lower data rates.

SUMMARY

Systems and methods for implementing multiple cyclic prefix lengths in power line communications (PLC) are described. Multiple cyclic prefix lengths may be used for both the data payload and frame control header or for the data payload alone.

A typical OFDM transmission packet comprises a preamble, header, and data symbols. The header and data symbols are OFDM symbols with an associated cyclic prefix. A frame control header (FCH) table is transmitted in the header symbols and includes a cyclic prefix field specifies the cyclic prefix length used in the data payload. The number of bits used in the cyclic prefix field determines the number of cyclic prefix length options available.

When decoding the FCH symbols, two options are possible. In one case, the FCH cyclic prefix length is always fixed and maybe different from the data cyclic prefix length. If the FCH cyclic prefix length is fixed, then it is always known to the receiver. In this case, there is no ambiguity for the receiver when decoding the FCH. In other cases, the FCH cyclic prefix length is the same as the data symbols cyclic prefix length but is unknown to the receiver. In this case, the receiver will have to decode the FCH symbols assuming various cyclic prefix hypotheses and then select the hypothesis that results in a CRC pass at the end of the FCH decoding.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
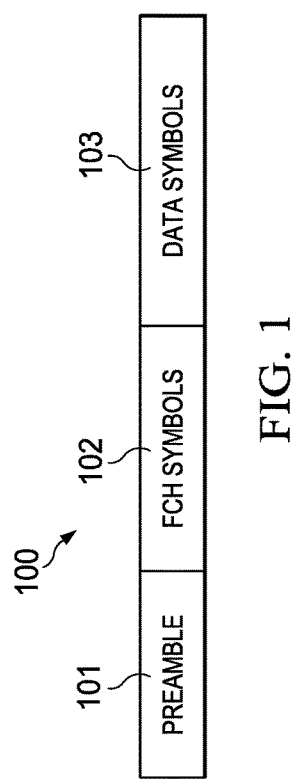

Having thus described the invention(s) in general terms, reference will now be made to the accompanying drawings, wherein:

FIG. 1 illustrates a typical OFDM transmission packet.

Figure 2:
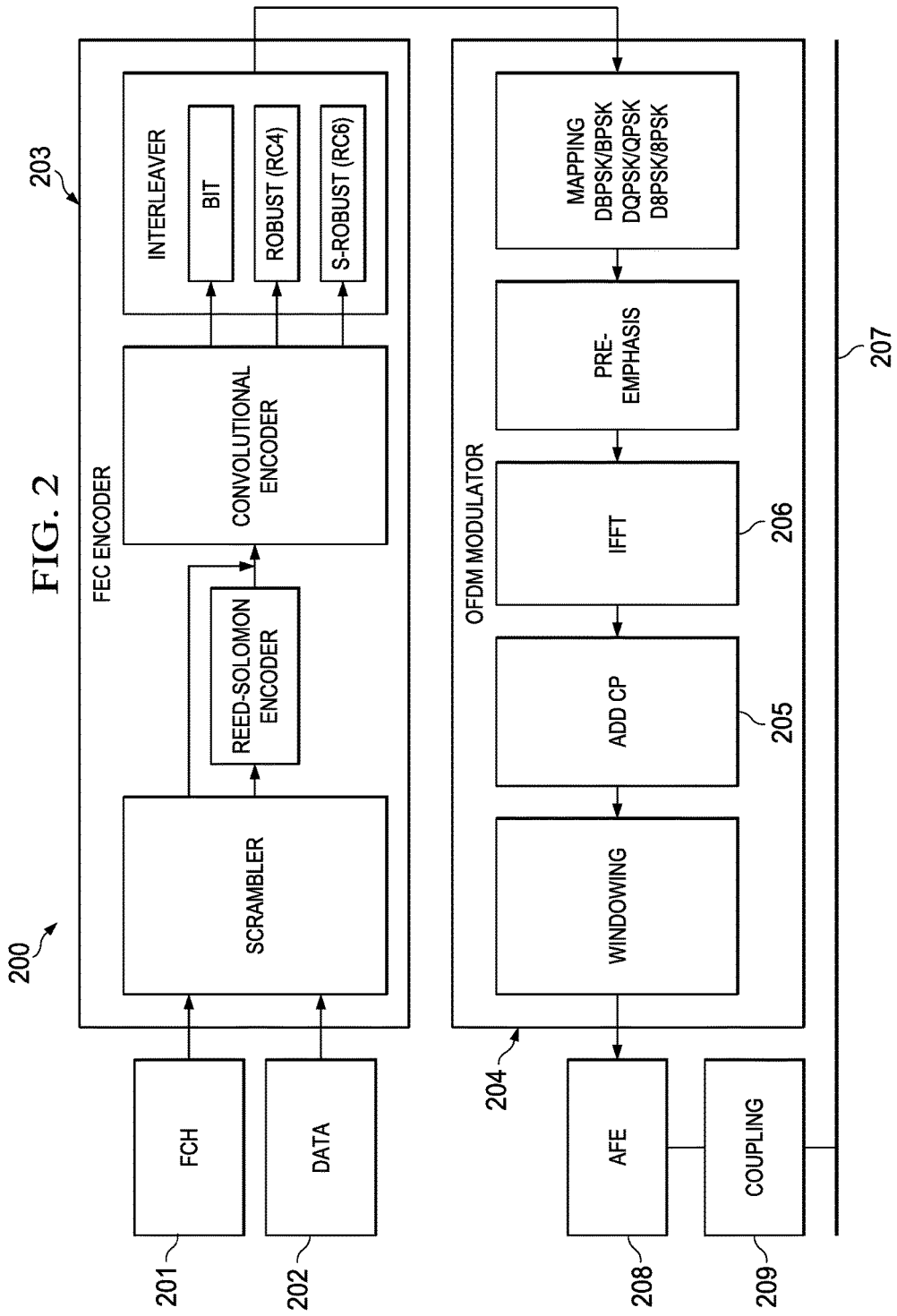

FIG. 2 is a high level block diagram of an OFDM transmitter for generating OFDM packets according to one embodiment.

Figure 3:
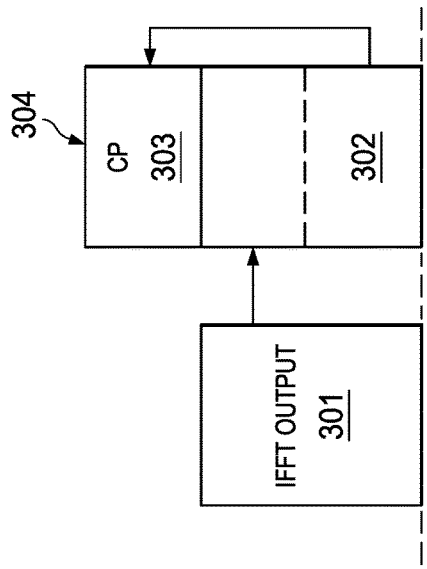

FIG. 3 illustrates the addition of the cyclic prefix according to one embodiment.

Figure 4:
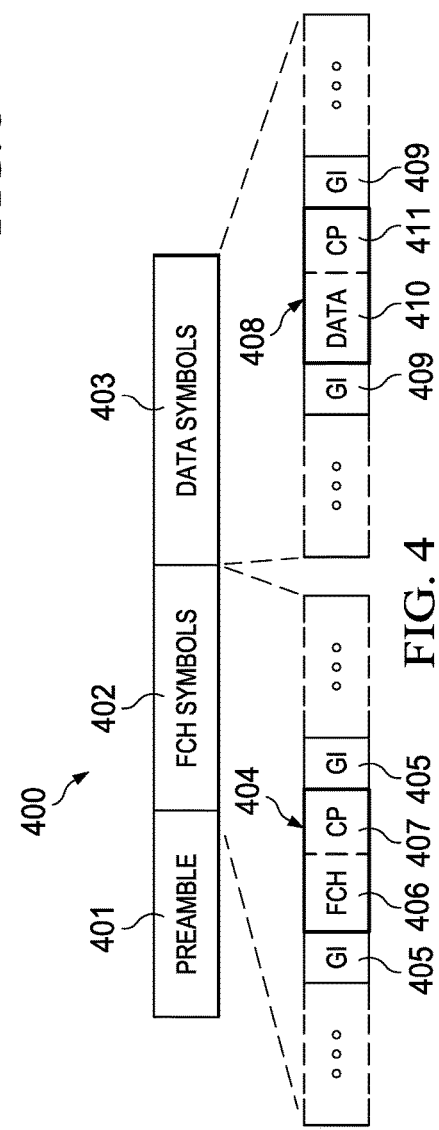

FIG. 4 illustrates an OFDM transmission packet incorporating aspects of the present invention.

Figure 5:
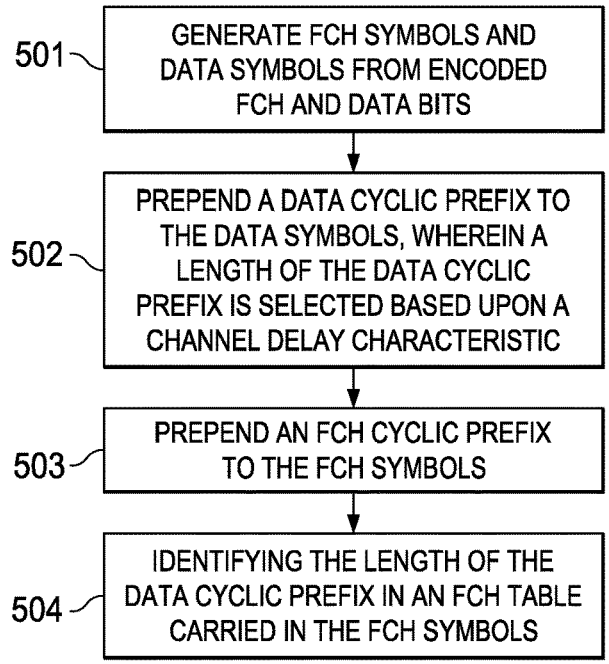

FIG. 5 is a flowchart illustrating a method or process for generating symbols in an OFDM modulator according to one embodiment.

Figure 6:
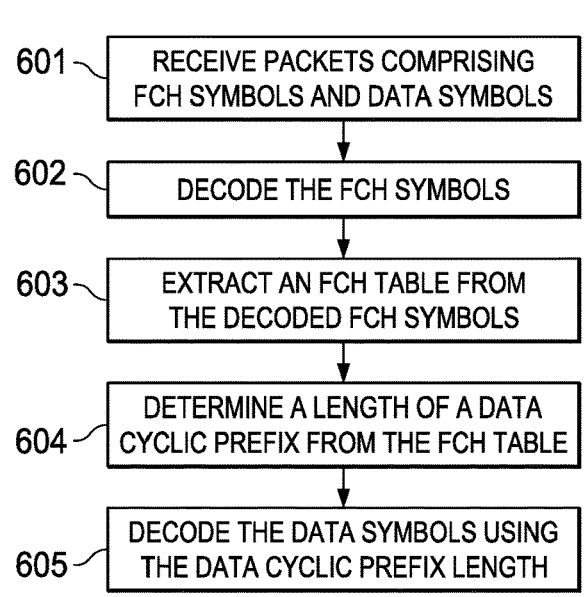

FIG. 6 is a flowchart illustrating a method or process for decoding symbols received by a receiver according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a typical OFDM transmission packet 100 comprising a preamble 101, frame control header (FCH) symbols 102, and data symbols 103. The preamble 101 typically consists of repeated sequences, such as a series of SYNCP and SYNCM symbols, which are used for automatic gain control adaptation, symbol synchronization, channel estimation, and initial phase reference estimation. FCH symbols 102 and data symbols 103 are OFDM symbols with an associated cyclic prefix.

FIG. 2 is a high level block diagram of an OFDM transmitter 200 for generating OFDM packets 100 according to one embodiment, such as for circuits complying with the IEEE P1901.2 standards. FCH bits 201 and data bits 202 are scrambled, encoded, and interleaved in a forward error correction (FEC) encoder 203. An OFDM signal is generated in a modulator 204 by performing inverse fast Fourier transform (IFFT) on the encoded bits. OFDM modulator 204 adds a cyclic prefix (CP) 205 to the output of the IFFT block 206. The output of the OFDM modulator 204 is provided to power line circuit 207, such as a medium voltage (MV) or low voltage (LV) power line, thorough analog front end (AFE) 208 and coupling circuitry 209. The coupling circuitry may include, for example, line drivers, transformers, filters, and MV/LV couplers.

In known power line communication systems, OFDM modulators add a cyclic prefix of predetermined size to both the FCH symbols and data symbols. In one embodiment, such as systems complying with the IEEE P1901.2 standards, the last 30 samples at the output of the IFFT block 206 are placed at the front of the symbols by add CP block 205.

FIG. 3 illustrates the addition of the cyclic prefix according to one embodiment. The IFFT block 206 generates 256 time-domain OFDM symbol samples (301). The add CP block (205) takes a group of samples (302) from the end of the 256 OFDM symbol samples (301) and copies them to the front of the 256 OFDM samples as a cyclic prefix 303 to create OFDM symbol 304 for transmission. In one embodiment, the last 30 samples (302) are used as the cyclic prefix. However, in other embodiments, any number of samples (302) may be used as the cyclic prefix.

In a system operating at 400 k samples per second, such as communications in the CENEILC A band, an OFDM symbol with 256 samples is 640 μs long (i.e., 256 samples/400 k samples-per-second). When a 30-sample cyclic prefix is added, then the OFDM symbol becomes 286 samples long, which corresponds to 715 μs long (i.e., 286 samples/400 k samples-per-second). The extra 30 samples make the OFDM symbol 75 μs longer (i.e., 30 samples/400 k samples-per-second).

When the delay spread increases, it would be desirable to adjust the size of the cyclic prefix to compensate for echoes and delays in the communication channel. Embodiments of the invention allow the system to select different cyclic prefix lengths for the FCH and the data symbols. The same cyclic prefix length may be used for both the FCH and the data symbols, or different cyclic prefix lengths may be used for each the FCH symbols and the data symbols.

When the transmitter can select between different cyclic prefix lengths, the receiver has to determine what cyclic prefix length was used in order to properly decode the received OFDM symbols. Additionally, the receiver must determine if the same or different cyclic prefix lengths were used for the FCH symbols and the data symbols.

Data Payload Decoding

The frame control header (FCH) table, which is transmitted in the FCH symbols, has information of the various PHY layer parameters in the data payload, such as modulation information, frame length/number of data symbols, tone map information, etc. In one embodiment, a cyclic prefix field is also included in the FCH table. The cyclic prefix field may specify the cyclic prefix length that is used in the data payload. The cyclic prefix length may be defined in terms of the cyclic prefix duration or number of samples comprising the cyclic prefix.

Table 1 illustrates an example cyclic prefix field using a two-bit field in the FCH table. The two-bit field supports four different cyclic prefix lengths as shown in Table 1. Each value of the cyclic prefix field corresponds to a different cyclic prefix length that may be used in the corresponding data symbols.

TABLE 1

| FCH Table Cyclic Prefix Field | Cyclic Prefix |
| --- | --- |
| 00 | X μs |
| 01 | Y μs |
| 10 | Z μs |
| 11 | W μs |

Table 2 illustrates a one-bit cyclic prefix field in the FCH table. With a one-bit cyclic prefix field, only two cyclic prefix lengths may be supported.

TABLE 2

| FCH Table Cyclic Prefix Field | Cyclic Prefix |
| --- | --- |
| 0 | X μs |
| 1 | Y μs |

In the example shown in Tables 1 and 2, the length of the cyclic prefix is depicted in micro-seconds; however, it will be understood that the length may also be represented as a number of samples in other embodiments.

FCH Decoding

At least the following options are possible at the receiver when decoding the FCH symbols if the FCH cyclic prefix length is unknown.

In one embodiment, the FCH cyclic prefix length is always fixed; however, the FCH cyclic prefix length may be different from the data cyclic prefix length. Since the FCH cyclic prefix length is fixed, it is always known to the receiver. In this case, there is no ambiguity for the receiver when decoding the FCH symbols. Once the FCH symbols are decoded, the data cyclic prefix length may be read from the FCH table and that value used to decode the data symbols.

In another embodiment, the FCH cyclic prefix length is the same as the data symbols' cyclic prefix length. In this case, the receiver decodes the FCH symbols assuming various cyclic prefix length possibilities and chooses the possibility that results in a successful CRC pass at the end of the FCH decoding. For example, referring to the example of Table 1 above, if there are four possible cyclic prefix lengths, then the receiver may attempt to decode the FCH using each of the possible cyclic prefix lengths in turn until the FCH is successfully decoded.

FIG. 4 illustrates an OFDM transmission packet 400 incorporating aspects of the present invention. Packet 400 comprises preamble 401, frame control header (FCH) segment 402, and data segment 403. Frame control header segment 402 comprises a plurality of FCH symbols 404 separated by guard intervals (GI) 405. Each of the FCH symbols 404 comprises a FCH segment 406 and an FCH cyclic prefix (CP) segment 407. Data segment 403 comprises a plurality of data symbols 408 separated by guard intervals (GI) 409. Each of the data symbols 408 comprises a data segment 410 and a data cyclic prefix (CP) segment 411.

The lengths of the FCH CP 407 and data CP 411 may be the same in one embodiment or may be different in other embodiments. The size of the data CP 411 may be encoded in an FCH table carried by FCH symbols 402. In some embodiments, the length of FCH CP 407 is predetermined and known to the receiver. The receiver uses the known FCH CP length when decoding the FCH symbols 404. When the FCH symbols 402 are all decoded, the value of the data CP 411 length is read from the FCH table and used to decode data symbols 403.

In other embodiments, the lengths of the FCH CP 407 and data CP 411 are the same, but unknown to the receiver. The receiver may attempt to decode FCH symbols 404 using known options for the CP length until the FCH symbols are successfully decoded. The FCH CP length value that results in successful FCH symbol decoding is then used to decode the data symbols 403.

Cyclic Prefix Selection in PLC

The transmitter may select the cyclic-prefix length based on characteristics of the PCL network. The cyclic prefix may be selected, for example, so that multi-path in the PCL network is within the cyclic prefix.

Deployment-Dependent Cyclic Prefix. The length of the cyclic prefix may be selected based on PLC network deployment characteristics. Multi-path arises in the PLC network due to signal reflections at termination points in the power lines. Thus, the type of cabling that is used, the length of the cables, the number of branch points, and similar factors can determine the amount of multi-path that is to be expected in the PLC network. In some deployments, the utility provider has accurate maps of the power-line communication links as well as information on the cabling used in the network. This information may be used to compute the expected amount of multi-path on the channel for different links. In this scenario, the cyclic-prefix length may be a network-configured parameter based on the expected amount of multi-path that is computed based on the PLC network topology and materials. Using this knowledge of the network topology and materials, the amount of multi-path expected for a given transmitter can be estimated and then used to determine an appropriate cyclic prefix for that transmitter.

Load-Dependent Cyclic Prefix. The amount of electrical load in the power line network may also determine the amount of multi-path experienced on the communication channel. When the electrical load is high in the network, reflections and multi-path may increase in the communication channel. Therefore, when there is high electrical loading on the PLC network, a longer cyclic prefix may be required for acceptable communication.

Time-Dependent Cyclic Prefix. High electrical loads typically occur in a residential environment during mid-day and evening hours, such as when many lights and appliances are in use. Additionally, electrical use varies depending upon the season, such as increased electrical loads in the summer due to air conditioning use. As a result, the cyclic prefix length used by a PLC transmitter may be time-dependent to account for varying electrical loads in the network. A utility provider may have historical use information that would allow it to estimate the electrical load at different times, days, or months. Using this expected load data, cyclic prefixes may be pre-calculated for the transmitter. The transmitter may then select the cyclic prefix to use depending upon the time, day, and/or month.

FIG. 5 is a flowchart illustrating a method or process for generating symbols in an OFDM modulator for a power line communication (PLC) device according to one embodiment. In step 501, FCH symbols and data symbols are generated from encoded FCH and data bits. In step 502, a data cyclic prefix is prepended to the data symbols. The length of the data cyclic prefix may be selected based upon a channel delay characteristic. In step 503, an FCH cyclic prefix is prepended to the FCH symbols. The length of the FCH cyclic prefix may be the same as the length of the data cyclic prefix. Alternatively, length of the FCH cyclic prefix may be a predetermined value that is different from the length of the data cyclic prefix.

In step 504, the length of the data cyclic prefix is identified in an FCH table carried in the FCH symbols. The length of the data cyclic prefix may be identified, for example, by setting one or more bits in a cyclic prefix field of the FCH table.

FIG. 6 is a flowchart illustrating a method or process for decoding symbols received by a receiver in a power line communication (PLC) device according to one embodiment. In step 601, packets comprising FCH symbols and data symbols are received. In step 602, the FCH symbols are decoded. The FCH symbols may be decoded using a predetermined FCH cyclic prefix length in one embodiment. In other embodiments, the FCH symbols are decoded using one or more known FCH cyclic prefix length values until the FCH symbols are successfully decoded.

In step 603, an FCH table is extracted from the decoded FCH symbols. In step 604, the length of a data cyclic prefix is determined from the FCH table. For example, the length of the data cyclic prefix may be determined from one or more bits in a cyclic prefix field of the FCH table. The data symbols are decoded in step 605 using the data cyclic prefix length. In one embodiment, the length of the FCH cyclic prefix is different than the length of the data cyclic prefix. In other embodiments, the lengths of the FCH cyclic prefix and the data cyclic prefix are the same, but not initially known to the receiver.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

We claim:

1. A method, comprising: performing, by a receiver in a power line communication (PLC) device: receiving packets that include frame control header (FCH) symbols and data symbols; decoding the FCH symbols: determining a length of a data cyclic prefix for the data symbols from a FCH table; and decoding the data symbols using the data cyclic prefix length from the FCH table.

2. The method of claim 1, further comprising: decoding the FCH symbols using a predetermined FCH cyclic prefix length.

3. The method of claim 1, wherein a length of a FCH cyclic prefix is the same as the data cyclic prefix length.

4. A powerline communications (PLC) device, comprising: a receiver configured to receive and decode packets that include frame control header (FCH) symbols and data symbols, the receiver further configured to determine a length of a data cyclic prefix from the decoded FCH symbols, the receiver further configured to decode the data symbols using the data cyclic prefix length.

5. The PLC device of claim 4, wherein the receiver decodes the FCH symbols using a predetermined FCH cyclic prefix length.

6. The PLC device of claim 4, wherein a length of a FCH cyclic prefix is different than the length of the data cyclic prefix.

7. The PLC device of claim 4, wherein a length of a FCH cyclic prefix is the same as the data cyclic prefix length.

8. The PLC device of claim 4, wherein the receiver determines the length of the data cyclic prefix from a one-bit prefix field.

9. A power line communication (PLC) device for sending and receiving data over a PLC network, comprising: a processor; a transmitter coupled to the processor; a receiver coupled to the processor; and a memory coupled to the processor, the memory storing program instructions that, when executed by the processor, cause the PLC device to: generate frame control header (FCH) symbols and data symbols from encoded FCH and data bits; prepend a data cyclic prefix to the data symbols, a length of the data cyclic prefix is selected based upon a characteristic of the PLC network; and identify the length of the data cyclic prefix in an FCH table carried in the FCH symbols.

10. The PLC device of claim 9, wherein the program instructions, when executed by the processor, cause the PLC device to also prepend a FCH cyclic prefix to the FCH symbols.

11. The PLC device of claim 10, wherein a length of the FCH cyclic prefix is a predetermined value that is different than the length of the data cyclic prefix.

12. The PLC device of claim 9, wherein identifying the length of the data cyclic prefix in the FCH table carried in the FCH symbols includes setting a one-bit cyclic prefix field in the FCH table to identify the length of the data cyclic prefix.

13. The PLC device of claim 9, wherein the characteristic of the PLC network that is used to select the length of the data cyclic prefix is a PLC network deployment characteristic.

14. The PLC device of claim 9, wherein the characteristic of the PLC network that is used to select the length of the data cyclic prefix is an electrical load in a PLC network.

15. The PLC device of claim 9, wherein the characteristic of the PLC network that is used to select the length of the data cyclic prefix is time dependent.

16. A power line communication (PLC) device for sending and receiving data over a PLC network, comprising: a processor; a transmitter coupled to the processor; a receiver coupled to the processor; and a memory coupled to the processor, the memory storing program instructions that, when executed by the processor, cause the PLC device to: receive packets that include frame control header (FCH) symbols and data symbols; decode the FCH symbols; determine a length of a data cyclic prefix from the FCH symbols; and decode the data symbols using the data cyclic prefix length.

17. The PLC device of claim 16, wherein decoding the FCH symbols includes decoding the FCH symbols using a predetermined FCH cyclic prefix length.

18. The PLC device of claim 16, wherein the length of the data cyclic prefix is different than a length of a FCH cyclic prefix.

19. The PLC device of claim 16, wherein the length of the data cyclic prefix is the same as a FCH cyclic prefix length.

20. The PLC device of claim 16, wherein the receiver determines the length of the data cyclic prefix from a one-bit prefix field.

* * * * *